US011101049B2

(12) United States Patent
Bezlepkin et al.

(10) Patent No.: US 11,101,049 B2
(45) Date of Patent: Aug. 24, 2021

(54) CONTAINMENT BUILDING SEPARATION SYSTEM AT A NUCLEAR POWER PLANT

(71) Applicants: JOINT STOCK COMPANY SCIENTIFIC RESEARCH AND DESIGN INSTITUTE FOR ENERGY TECHNOLOGIES ATOMPROEKT, St. Petersburg (RU); JOINT STOCK COMPANY "SCIENCE AND INNOVATIONS" ("SCIENCE AND INNOVATIONS", JSC), Moscow (RU)

(72) Inventors: Vladimir Victorovich Bezlepkin, St. Petersburg (RU); Vladimir Olegovich Kukhtevich, St. Petersburg (RU); Andrey Gennadievich Mitryukhin, St. Petersburg (RU); Maksim Anatolyevich Drobyshevskiy, St. Petersburg (RU); Mikhail Sergeevich Ustinov, St. Petersburg (RU); Nadezhda Yuryevna Shurygina, St. Petersburg (RU)

(73) Assignees: JOINT STOCK COMPANY SCIENTIFIC RESEARCH AND DESIGN INSTITUTE FOR ENERGY TECHNOLOGIES ATOMPROEKT, Saint-Petersburg (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/312,190

(22) PCT Filed: Dec. 29, 2016

(86) PCT No.: PCT/RU2016/000945
§ 371 (c)(1),
(2) Date: Dec. 20, 2018

(87) PCT Pub. No.: WO2018/124914
PCT Pub. Date: Jul. 5, 2018

(65) Prior Publication Data
US 2019/0311817 A1 Oct. 10, 2019

(51) Int. Cl.
G21C 9/004 (2006.01)
G21C 13/10 (2006.01)
G21C 13/028 (2006.01)

(52) U.S. Cl.
CPC ............ *G21C 9/004* (2013.01); *G21C 13/10* (2013.01); *G21C 13/028* (2013.01); *Y02E 30/30* (2013.01)

(58) Field of Classification Search
CPC ........ G21C 9/004; G21C 9/001; G21C 9/008; G21C 9/024; G21C 13/02; G21C 13/022;
(Continued)

(56) References Cited

U.S. PATENT DOCUMENTS 4,908,179 A * 3/1990 Brookins ................. F16J 15/46
376/203
8,509,376 B2 * 8/2013 Eckardt ..................... G21C 9/06
376/293

(Continued)

FOREIGN PATENT DOCUMENTS

DE 3206369 A * 9/1983 ............... F16J 15/46

*Primary Examiner* — Darlene M Ritchie
(74) *Attorney, Agent, or Firm* — Brandon V. Zuniga; James R. Gourley; Carstens & Cahoon, LLP

(57) ABSTRACT

Nuclear power plant (NPP) containment building separation system dividing the NPP containment building into isolated containment building rooms. The system includes containment building separation shutters located in the circular gap which divides the containment building rooms and the containment building walls; an air supply unit connected to a manifold ring which, in turn, is connected to the air-inflated shutters designed to ensure insulation of the airspace inside the containment building rooms when inflated and to
(Continued)

Figure 1:
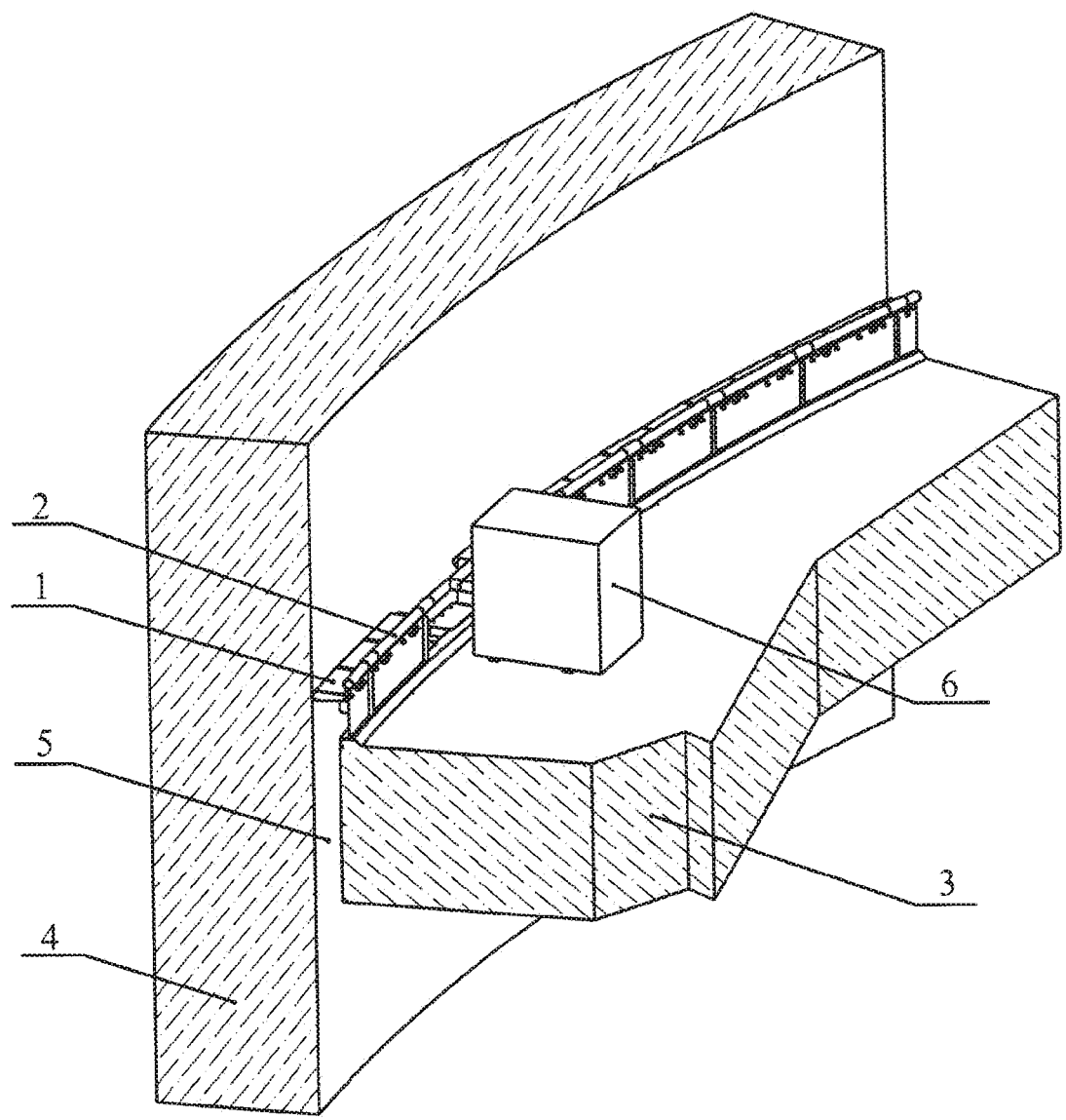

connect the airspace when deflated. In emergency mode the air supply to the air-inflated shutters is terminated, and the shutters get deflated and fully open the circular gap which ensures convection process throughout the whole area of containment building.

11 Claims, 4 Drawing Sheets

(58) Field of Classification Search
CPC ............... G21C 13/024; G21C 13/028; G21C 13/0285; G21C 13/04; G21C 13/06; G21C 13/063; G21C 13/073; G21C 13/0735; G21C 13/10; G21C 15/26; Y02E 30/30; F16K 17/003; F16K 17/14; F16K 17/386; F16K 17/40
See application file for complete search history.

(56) References Cited

U.S. PATENT DOCUMENTS

| | | | | |
|---|---|---|---|---|
| 9,966,154 | B1* | 5/2018 | Wattenburg | G21C 15/18 |
| 2012/0027153 | A1* | 2/2012 | Sugiura | G21C 13/00 376/203 |
| 2015/0243379 | A1* | 8/2015 | Buhlmann | G21C 19/303 376/283 |
| 2016/0336081 | A1* | 11/2016 | Sato | G21C 13/10 |
| 2016/0343459 | A1* | 11/2016 | Mitchell | G21C 17/00 |
| 2018/0012669 | A1* | 1/2018 | Peterson | G21C 15/12 |
| 2018/0274167 | A1* | 9/2018 | Kodera | B60R 21/235 |
| 2019/0341159 | A1* | 11/2019 | Gaulupeau | G21C 19/02 |

* cited by examiner

CONTAINMENT BUILDING SEPARATION SYSTEM AT A NUCLEAR POWER PLANT

CROSS-REFERENCE TO RELATED APPLICATIONS

This application is a US 371 Application from PCT/RU2016/000945 filed Dec. 29, 2016, the technical disclosures of which are hereby incorporated herein by reference.

FIELD OF THE INVENTION

The invention is related to safety systems of nuclear power plants (NPP) which can be used in various operational modes, including emergency mode, and is aimed at controlling air flows inside NPP containment building.

BACKGROUND OF THE INVENTION

Inside buildings and premises with the sources of ionizing radiation and/or other hazardous emissions, forced-flow exhaust ventilation systems are usually installed. A ventilation system is arranged so to ensure the directed flow of air out of non-contaminated manned rooms to contaminated unmanned rooms. No. backflow of air which can cause contamination of manned rooms are allowed. Pressure relief valves are installed in the vent holes between the rooms to prevent the air backflow through the vent holes, therefore, the pressure in each room downstream the airflow is lower than in the previous room, located upstream. The rest wall openings and openings in the floor slabs are equipped with doors, shutters and other devices which are to be kept closed.

The external walls of the building act as a containment which protects the environment from the hazardous emissions which may escape from the building. NPP reactor buildings are designed the same way. In case of emergency caused by sharp pressure rise inside the building (for example, explosion, blast of pressure vessels, pipes and circulation systems etc.) the blast wave should be directed to all the premises inside the building. In this case the overall pressure onto the walls and floor slabs will be lower than the blast pressure localized inside just one of the premises.

NPP reactor buildings are designed according to the same construction principles: there is a gap between the wall of the building and the floor slab, through this gap the blast wave spreads across the whole building to all the premises; through this gap the water sprayed with sprinkler systems is drained to water catch pits; through the same gap the hydrogen generated during a severe accident goes up to the dome where there are a lot of hydrogen igniters.

To meet all the above conditions the gap should be designed with a special shutter device which is to comply with the following requirements:

the gap is to be shut off the shutter is to be on in the normal operational mode equipment operation and during equipment failures not causing pressure rises inside the building;

the shutter should withstand the pressure drop generated between the rooms by the ventilation system in normal operational mode;

the shutter should automatically open when the pressure rises in one of the premises as a result of an accident; opening of the shutter will ensure pressure relief for the floor slabs and external walls of the building and connecting all the internal rooms in the whole airspace.

if an emergency occurs and the pressure rises inside the building, a shutter should open across the whole cross-section of the gap to prevent the air pockets to appear where hydrogen may accumulate.

the cross-section of the gap should not be blocked when the shutter is open in order not to reduce the gap.

Wherein the heat generated by the equipment located in the lower rooms causes the temperature inside these rooms to be much higher that in the upper rooms, this creates additional lifting force; this is the reason why it is impossible to ensure reliable isolation of airspace inside the premises during normal operational mode without shutting them down, only by means of forced-flow and exhaust ventilation systems. Therefore, an important goal is to design a containment building separation system at (NPPs) with a possibility to ensure isolation of the airspace inside the containment building rooms during normal operational mode, and able to connect the airspace between the premises in case of a severe accident in one of the premises inside the containment.

Various technical solutions were introduced to achieve this goal before today.

There is information about a containment building of an advanced water-cooled nuclear reactor (U.S. patent Ser. No. 09/502,142 published on 21 Jan. 2016). This containment building is divided into several containment zones which are separated from each other with partitions in a way to be able to localize the accident within one of the containment zones. At this point the partitions have the same durability and thermal insulation as the containment zones. The advantage of this solution is possibility to ensure safe radiation background through all the containment zones when an accident occurs in one of them. A disadvantage of this solution is increased pressure onto the containment building walls because the pressure is concentrated within only one of the containment zones and accumulation of explosion-dangerous hydrogen in this zone.

There is also information about technical solutions with the use of rupture diaphragms. There is information about a shutter device for NPP containment buildings (application PCT/EP/2007/000572 published on 13 Sep. 2007). This shutter device is a gas-tight partition which divides the containment building into two zones, one of this zones accommodates the reactor pressure vessel and the primary coolant circuit, and the other zone is a manned room accessible by personnel during normal operational mode; the gas-tight partition has several bypass openings which are closed with an element containing a rupture diaphragm or a burst valve initiated at pressure drop.

The closest equivalent to the alleged invention is a passive-cooled nuclear reactor (application EP 0476563 published on 25 Mar. 1992). In this installation a steel containment building is divided into two rooms: a lower room with a reactor and pressurized water, and upper room with an operational floor. The rooms are isolated from each other with a partition which contains a burst valve initiated at a certain value of pressure drop which occurs during a severe accident, initiation of this burst valve allows to connect two rooms to reduce pressure during a severe accident.

The two above solutions allow the airspace of upper and lower rooms to be instantly connected if a high value of pressure drop occurs as a result of an accident, having two rooms connected into one airspace is a way to reduce pressure onto the containment building walls and prevent accumulation of hydrogen by ensuring further convection of steam and gas mixture inside the containment building, however, these solutions have some disadvantages. In particular, constantly increasing pressure on one side cause delayed initiation of these systems, if they will be initiated at all. Additionally, rupture diaphragms upon bursting are able to provide a relatively small cross-section for the airspace in one room to be connected to the airspace inside the other room. Even more, upon a sharp pressure drop inside one of the containment zones, only those rupture diaphragms will be initiated which are located close to the zone where the pressure drop occurred, and the rest diaphragms remain intact, this will cause hydrogen to accumulate in those closed zones and will lead to impaired convection of steam and gas mixture, as well as the operation of sprinkler systems. On top of that, rupture discs have one disadvantage: their burst pressure depends on the direction of pressure force. In the described equivalents it is assumed that the excessive pressure will occur in the lower level, meanwhile there can be accidents when the excessive pressure occur in the upper level, above the containment building separation systems, i.e from the side of manned premises. However, there is information about some accidents when the excessive pressure occurred in the lower level of containment building. After bursting the rupture discs and diaphragms cannot be used again for separation of airspace inside the containment building rooms without their removal and replacement. All these factors have a negative impact on the status of NPP operational safety.

SUMMARY OF THE INVENTION

The object of this invention is to design a containment building separation system for NPP which would allow to enhance NPP operational safety both during normal operation and in emergency mode by means of having the airspace of all NPP containment building rooms connected in their wider cross-section and along the whole perimeter of the containment in case any accident occurs inside the containment.

The technical result of this invention if enhanced NPP operational safety both in normal operational mode and in emergency by means of having the airspace of all NPP containment building rooms connected in their wider cross-section and along the whole perimeter of the containment in case any accident occurs inside the containment.

The technical result is achieved by introducing a containment building separation system applicable for NPPs and dividing the NPP containment building into isolated rooms. The system includes the following components and functionality: it is installed on the floor slab between the rooms and located in the circular gap between the floor slab and the containment building wall. The system includes, at least, one isolating valve to ensure insulation of the airspace in the containment building rooms, and is configured to connect the airspace in the containment building rooms following the pressure drop which may occur. Additionally the system contains an air supply unit connected to the manifold ring. The manifold ring is connected to each of the valves in the containment building separation system. At this point each of the valves is designed as an air-inflated shutter aimed at providing insulation of the airspace inside the containment building rooms when inflated and at connecting the airspace when deflated.

It is recommended to have air-inflated shutters made of fabric.

It is feasible to have air-inflated shutters made of rubber-coated fabric.

It is recommended to have air-inflated shutters designed adjacent to each other.

It is recommended to provide the containment building separation system with a support structure elements installed on the floor slab between the rooms; the air-inflated shutters are to be fixed to the support structure elements.

It is sensible to arrange vertical service tunnels between some of the air-inflated shutters.

The air supply unit is recommended to be designed as a blow fan or an air blower.

It is feasible to have at least two air supply units integrated in the containment building separation system.

A return valve is recommended to be installed at the outlet of the air supply unit.

It is sensible to have the containment building separation system equipped with pressure transmitters installed in various areas of the containment building, and with a control module connected with the pressure transmitters and with the air supply unit.

It is recommended to have a manifold ring equipped with a continuously operating pressure relief nozzle.

The advantage of this system is enhanced NPP operational safety both in normal operational mode and in emergency. Providing a containment building separation system with an air supply unit connected to the manifold ring which, in turn, is connected to the valves. The valves are designed as air-inflated shutters made of fabric: when inflated they ensure insulation of the airspace inside the containment building, when deflated they connect the airspace of the containment building rooms. The containment building separation system contributes to the enhanced level of radioactive safety during normal operational mode by isolating the containment building rooms with different radioactive background from each other. In case of emergency the shock wave passes through the fabric shutters and bends them in the direction of the room where the pressure is lower, this helps to reduce the pressure onto the containment building walls. After the accident the shutters get deflated. The containment building separations system fully closes the circular gap between the premises and ensures convection process and uniform distribution of explosion-dangerous products left after the accident. Using rubber coated fabric as a material for producing air-inflated shutters provides for enhanced NPP operational safety because this material will prevent the shutters from contamination which may appear during normal operation and makes the shutters heavier. Having the air-inflated shutters adjoining each other or adjoining the vertical service tunnels between them provides for enhanced NPP operational safety during normal operational mode due to improved insulation of the premises with different radiation background. Having the air supply unit designed as a blow fan or an air blower contributes to enhanced NPP operational safety because the functioning of the air supply units does not depends on the processes inside the containment. Using at least two air supply units provides for enhanced NPP operational safety due to having a redundant air supply unit. Using a return valve at the outlet of the air supply unit provides for NPP operational safety because it allows to maintain pressure in the air-inflated shutters during normal operational mode with this particular air supply unit functioning as a redundant one. Having the containment building separation system equipped with additional pressure transmitters installed in different zones of the containment building, and a control module connected to the air supply unit provides for the enhanced NPP operational safety, because it was made possible to deactivate the air supply units in case the pressure inside the containment rises, deactivation of the air supply units causes the shutters to deflate and the circular gap gets fully open. Adding a continuously operating pressure relief nozzle to the manifold ring provides for NPP operational safety in emergency due to increased speed of the air release from the shutters and more instant opening of the circular gap.

BRIEF DESCRIPTION OF FIGURES AND DRAWINGS

FIG. 1 represents a general view of the containment building separation system at NPP in a preferable embodiment which includes the following components: air-inflated shutters 1 installed on a support structure elements which are attached to the floor slab 3; the shutters are connected with a manifold ring 2 connected to an air blower 6 installed on the floor slab 3 The air-inflated shutters 1 are filled with air and are designed to close the circular gap 5 between the floor slab 3 and the containment building wall 4.

Figure 2:
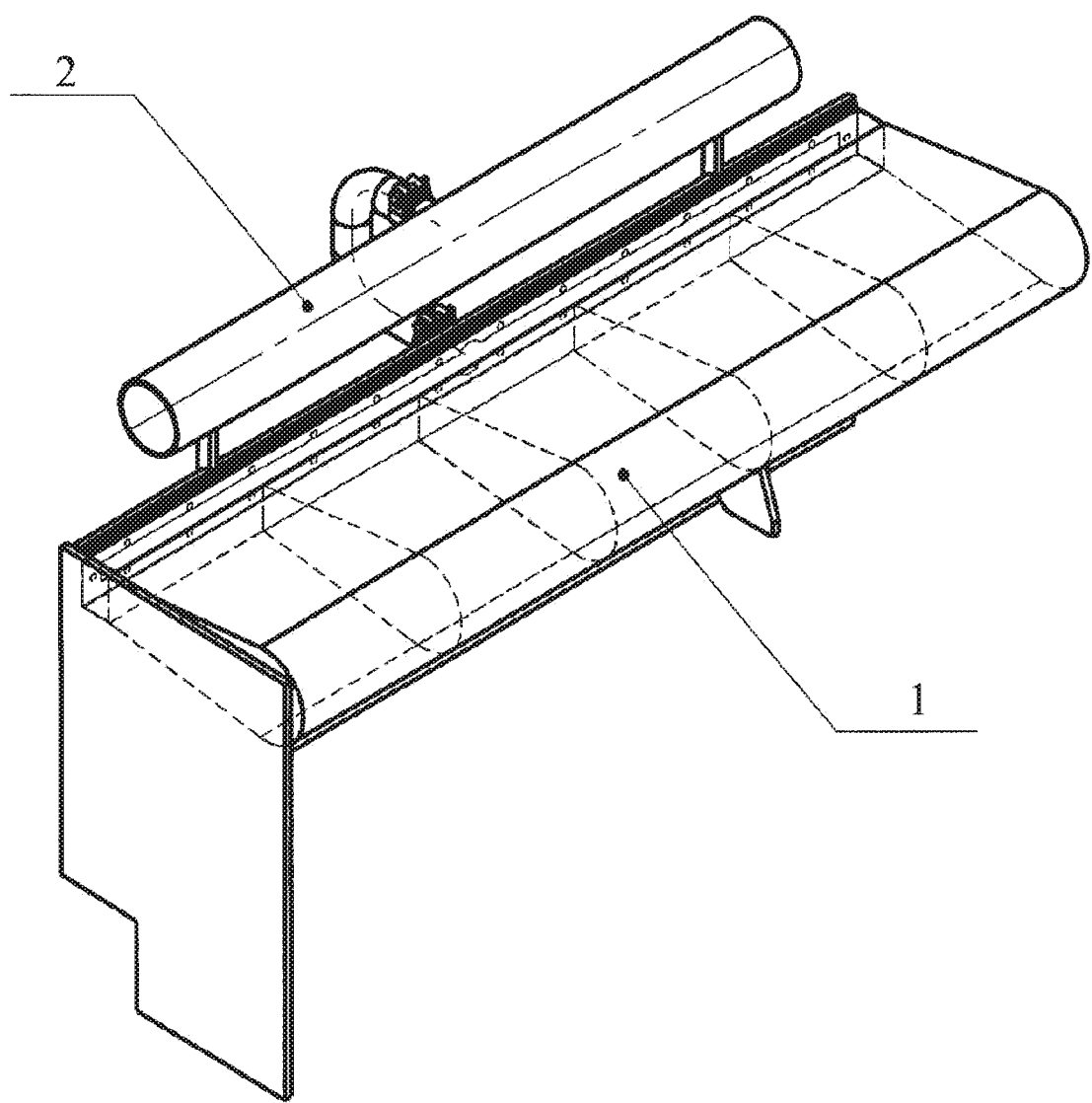

FIG. 2 represents a preferable embodiment of an air-inflated shutter 1 installed on a support structure element and connected to a manifold ring 2 by means of a pipe, the shutter shown in the FIGURE is ON.

Figure 3:
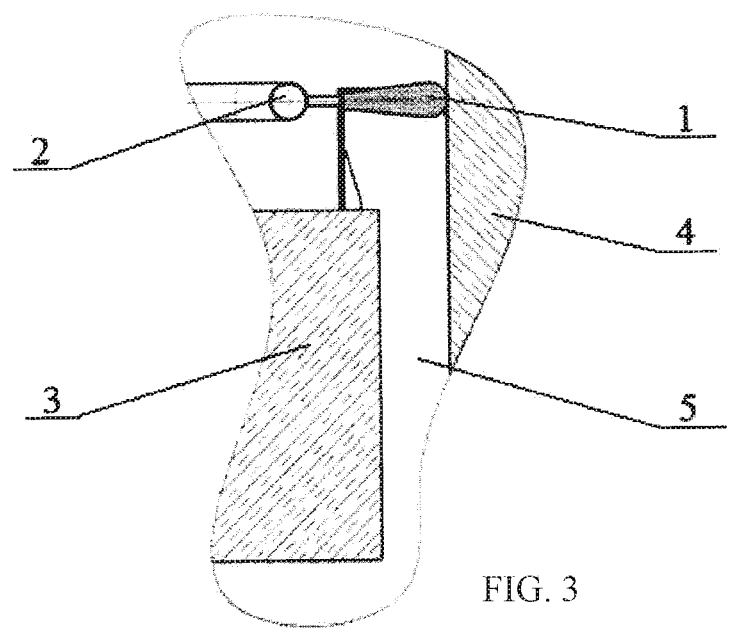

FIG. 3 represents a sectional view of the containment building separation system during the normal operational mode. The containment building separation system is installed between the floor slab 3 and the containment building wall 4 inside the circular gap 5 and includes the air-inflated shutters 1 connected to the manifold ring 2, the circular gap 5 is fully closed with the air-inflated shutter 1.

Figure 4:
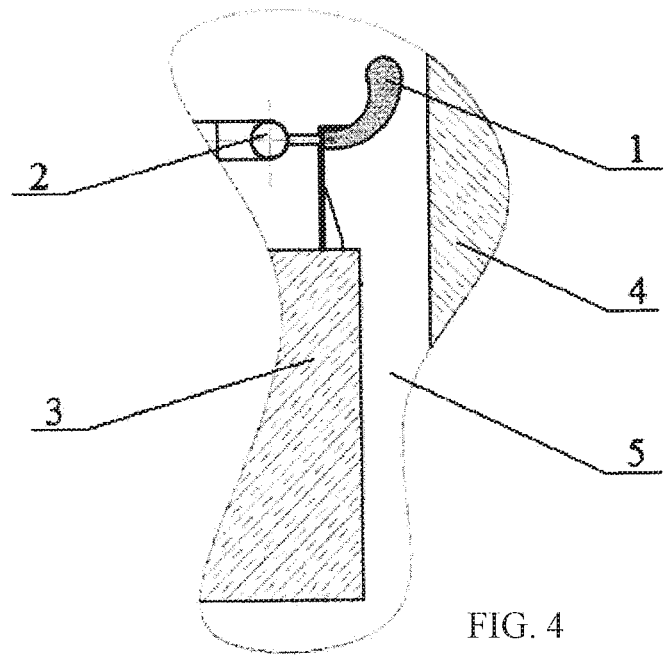

FIG. 4 represents a sectional view of the containment building separation system at the moment of shock wave impact. The containment building separation system is installed between the floor slab 3 and the containment building wall 4 inside the circular gap 5 and includes the air-inflated shutters 1 connected to the manifold ring 2, the circular gap 5 is partially opened after the shock wave impact resulted from the pressure drop in the lower premises.

Figure 5:
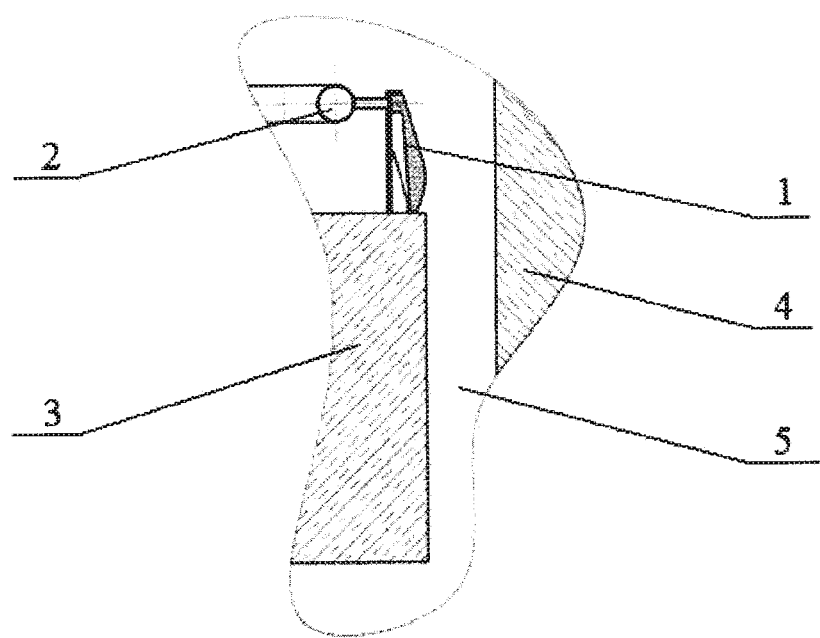

FIG. 5 represents a sectional view of the containment building separation system after the air-inflated shutter 1 is deflated. The containment building separation system is installed between the floor slab 3 and the containment building wall 4 inside the circular gap 5 and includes the air-inflated shutters 1 connected to the manifold ring 2, the circular gap 5 is fully opened.

EMBODIMENTS

The preferable embodiment of the containment building separation system consists of the following components: a containment building separation package located in the circular gap 5 between the floor slab 3 which divides the containment building rooms one from another, and the containment building wall 4. The containment building separation package is represented with air-inflated shutter 1 tightly adjoining each other, this arrangement makes it possible to have the circular gap 5 fully closed during normal operational mode. Air-inflated shutters 1 are installed on a support structure which is attached to the floor slab 3 dividing the containment building rooms from each other. Wherein air-inflated shutters 1 by means of pipes are connected to the manifold ring 2 through which the air is supplied to the shutters from the air supply unit. The air supply unit, in the preferable embodiment, is represented with 2 blower fans 6, one of them supplies the air to the manifold ring 2, and the other one is redundant. Wherein both of the blower fans are equipped with return valves to prevent the air backflow through the redundant blower fan. The containment building separation system includes also a control module not shown in the FIGURE, connected to the pressure transmitters not shown in the FIGURE, which are located in various zones of the containment building.

In one of the embodiments it is possible to connect the manifold ring 3 to the ventilation system of NPP containment building, instead of using an independent blower fan 6.

NPP containment building separation system in the preferable embodiment functions as following: In normal operational mode one of the blower fans 6 injects pressure into the manifold ring 2 via a return valve. The air-inflated shutters 1 are, therefore, filled with air and fully close the circular gap 5 between the floor slab 3 and the containment building wall 4, as shown in FIG. 3. Thus, the upper room of the containment building is fully isolated from the lower one, where the radioactive background is higher, and NPP personnel can attend this upper room for servicing the machines and plants inside this room. According to the calculations, to ensure reliable insulation between the upper room and the lower room it is enough to have the circular gap 5 95% closed, in this case the forced-flow exhaust ventilation system will generate the pressure drop between the room which will be sufficient to prevent upstream airflows from the lower room to the upper room. A system control module monitors the indications of the pressure transmitters inside the containment. In case one of the blower fans 6 fails, the control module activates the second blower fan 6 to have the circular gap 5 fully closed, this will allow the NPP personnel to carry out instant field repair of the collapsed blower fan 6 without being exposed to any radioactive hazard.

If a severe accident occurs, for example, a breakage of a pressurized water supply pipeline located in the lower section of the containment took place, this damaged pipe caused a high pressure zone of steam and gas mixture to appear, the mixture includes hydrogen among other gases, this high pressure zone generates a shock wave which rushes through the air-inflated shutters 1 at one of the circular gap 5 segments, as shown in FIG. 4. This became possible because the air-inflated shutters 1 are made of fabric, and, therefore, they are flexible and vulnerable to shock wave impact. The shock wave impact is distributed within both of the containment zones, and the pressure onto the containment building walls 4 is reduced. The pressure transmitters indicate sharp pressure rise which is registered by the control module. The control module deactivates both of the blower fans 6. In practice when the pressure inside the containment rises above 0.129 MPa so called 'setpoint pressure' all electric systems are deactivated, which means that blower fans 6 are switched off as well. When NPP ventilation system is used for supplying air to the containment building separation system, it is also deactivated following the above the pressure rise. As a result all air-inflated shutters 1 along the whole perimeter of the containment get deflated and return to a vertical position, as shown in FIG. 5, so the circular gap 5 becomes fully open. In the preferable embodiment the air-inflated shutters 1 are made of fabric to ensure instant deflation through the pores of the fabric when No. air is supplied from the blower fans 6. This ensures uniform distribution of hydrogen concentration and pressure of steam and gas mixture throughout the whole containment to protect the walls 4 of the containment and keep them free of damage. Besides that, the water which was sprayed by sprinkler systems located under the dome of the containment flows through the open circular gap 5 directly into the catch pits tanks of the containment.

After a severe accident has been localized and the consequences were eliminated, it is possible to instantly close the circular gap 5 by activating the blower fans 6. This will provide for the insulation of the manned upper room of NPP containment from the source of radioactive emissions, and due to this insulation it will be possible to arrange the process of NPP recovery to restore normal operational mode as soon as possible.

In one of the embodiments it was offered to add to the manifold ring a pipe for uninterrupted discharge of air into the containment airspace. In this case the pressure produced by the operating blower fan 6 will be sufficient to keep the shutters inflated, after the blower fans get OFF as a result of any severe accident, the shutters will be deflated and the air will be discharged through this pipe. Using the pipe for continuous air discharge is not a pre-requisite for implementation of this invention, but it makes the process of air discharge from the shutters 1 faster, and therefore, opening of the circular gap 5 also becomes faster. Another embodiment offers to use the air discharge pipe activated with a command from the control module following the pressure drop or if the pressure inside the containment reaches the setpoint value.

Using blower fans or air blowers 6 for supplying air to the containment building separation system is a recommended choice as compared with using the plant ventilation system, as they make a containment building separation system independent of the ambient conditions inside the containment.

In the preferable embodiment the containment building separation system contains vertical service tunnels located between some of the air-inflated shutters.

It is also acceptable to use metal shutters instead of air-inflated fabric shutters 1, however, this embodiment has some disadvantages. In particular, metal shutters are quite heavy, so to have them capable to let the shock wave impact through, a complicated mechanism is required, which includes special louvers, and this complicated design will influence the reliability of the shutters.

It is assumed that the service life of air-inflated shutters 1 made of fabric is longer than the NPP service life, the design of air-inflated shutters 1 makes it possible to replace the shutters very quickly. A factory-made design includes an air-inflated shutter 1 made of fabric and attached to the support structure used for installation of the whole system onto the support base, the shutter is fixed to the support structure with two pins.

INDUSTRIAL APPLICABILITY

NPP containment building separation system provides for the enhanced safety level both in normal operational mode, and during severe accidents, and is applicable for any type of containments.

The invention claimed is:

1. A nuclear power plant (NPP) containment building separation system configured to divide an NPP containment building into isolated containment building rooms, the containment building separation system configured to be installed on a floor slab between the containment building rooms, and the containment building separation system configured to be at least partly located in a circular gap between the floor slab and a containment building wall, the containment building separation system comprising:
at least one isolating valve configured to ensure insulation of (i) a first airspace in a first room of the containment building rooms from (ii) a second airspace in a second room of the containment building rooms, and the at least one isolating valve configured to connect the first airspace and the second airspace in the containment building rooms following a possible pressure drop;
a manifold ring connected to each valve of the at least one isolating valve in the containment building separation system;
an air supply unit connected to the manifold ring and configured to supply air to the manifold ring; and
wherein each valve of the at least one isolating valve is designed as an air-inflated shutter configured: (i) to provide insulation of the first airspace from the second airspace inside the containment building rooms when inflated, (ii) to connect the first airspace and the second airspace when deflated and (iii) to bend in the direction of a lower pressure room following the possible pressure drop, the lower pressure room being selected from the group of rooms consisting of the first room and the second room, and the lower pressure room being the room in the group of rooms where pressure is lower.

2. A containment building separation system according to claim 1, the at least one isolating valve comprising a plurality of isolating valves, the containment building separation system comprising support structure elements configured to be installed on the floor slab dividing the first room and the second room from each other, each of the air-inflated shutters being attached to a corresponding support structure element of the support structure elements.

3. A containment building separation system according to claim 1, wherein the at least one isolating valve comprises a plurality of isolating valves, and wherein the air-inflated shutters adjoin to each other.

4. A containment building separation system according to claim 1, wherein the air supply unit comprises a blower fan or an air blower, and wherein the containment building separation system is configured so that the air from the air supply unit is supplied via ft the blower fan or the air blower.

5. A containment building separation system according to claim 1, comprising at least two air supply units.

6. A containment building separation system according to claim 1, comprising a return valve installed at the outlet of the air supply unit.

7. A containment building separation system according to claim 1, comprising pressure transmitters and a control module for the air supply unit, the pressure transmitters configured to be located in at least one room inside the NPP containment building; the pressure transmitters connected to the control module; and the control module connected to the air supply unit.

8. A containment building separation system according to claim 1, wherein the at least one isolating valve comprises a plurality of isolating valves, and wherein the manifold ring is a circular pipe connected to each of the air-inflated shutters.

9. A containment building separation system according to claim 1, comprising a continuously operating pressure relief nozzle, wherein the manifold ring is equipped with the continuously operating pressure relief nozzle.

10. A containment building separation system according to claim 1, wherein the at least one isolating valve comprises a plurality of isolating valves, and wherein the air-inflated shutters are made of fabric.

11. A containment building separation system according to claim 10, wherein the air-inflated shutters are made of resin-coated fabric.

* * * * *